Feb. 26, 1952 A. A. VARELA 2,586,888
ECHO RANGING AND IDENTIFICATION SYSTEM
Filed June 13, 1945 2 SHEETS—SHEET 1
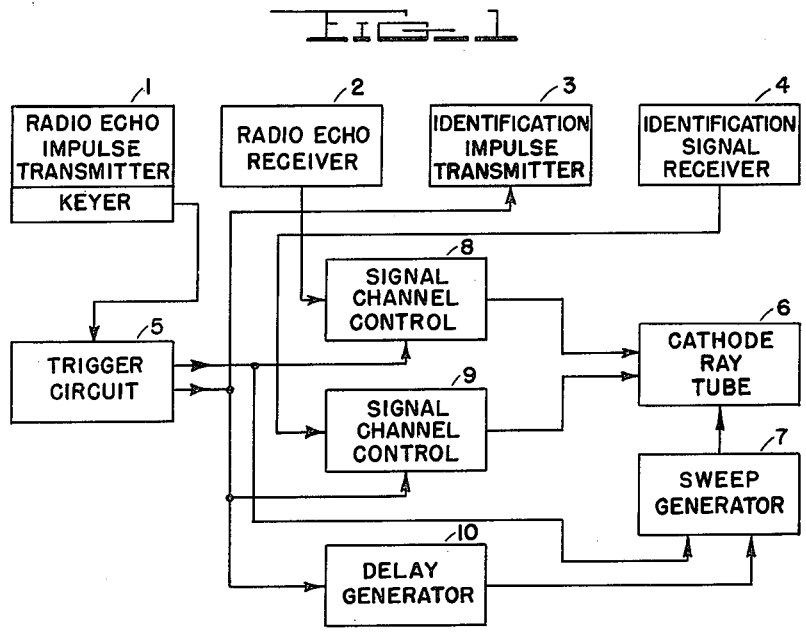
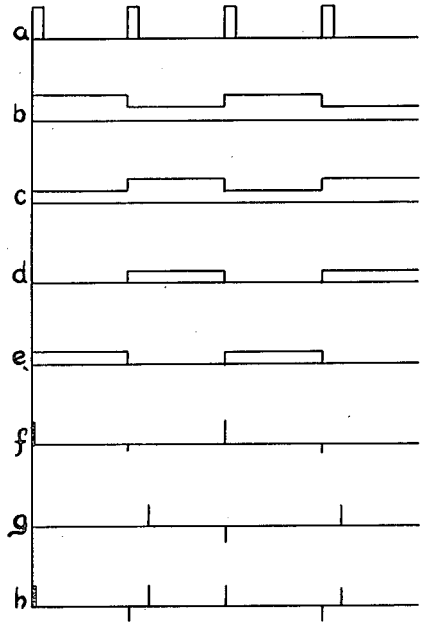
Inventor
A. A. VARELA

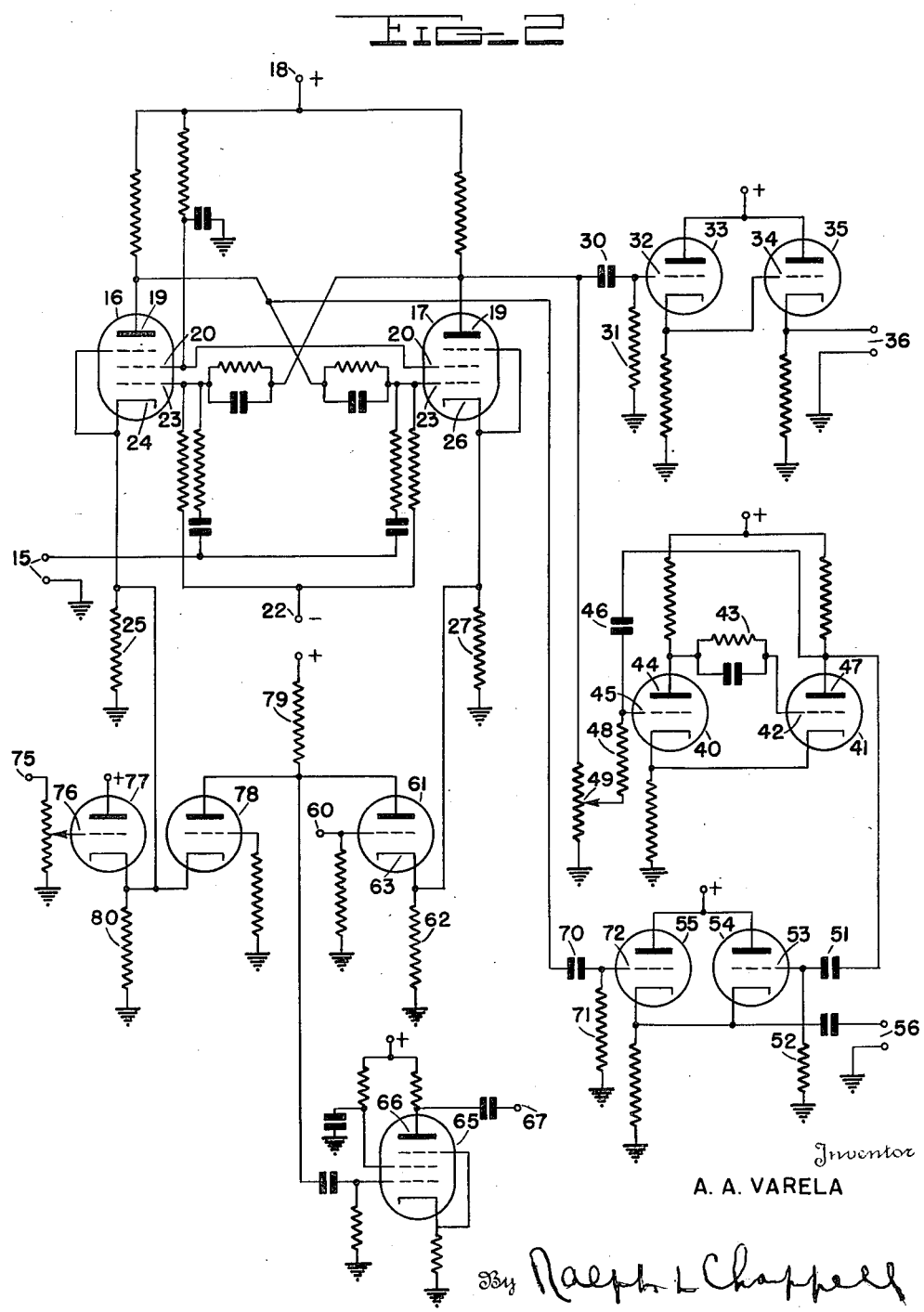

Patented Feb. 26, 1952

2,586,888

UNITED STATES PATENT OFFICE 2,586,888

ECHO RANGING AND IDENTIFICATION SYSTEM

Arthur A. Varela, Washington, D. C.

Application June 13, 1945, Serial No. 599,289

12 Claims. (Cl. 343—6)

(Granted under the act of March 3, 1883, as amended April 30, 1928; 370 O. G. 757)

This invention relates to echo ranging and obstacle identification systems, and is particularly directed to the problem of coordinate operation of such systems.

In echo ranging systems a transmitted impulse is reflected from an obstacle, and the elapsed time between transmission and echo reception is employed to determine the range of the object. Normally a radio frequency electromagnetic impulse is employed, and the transmitted or reflected signals are directly indicated on a cathode ray tube time base.

Obstacle identification systems include an interrogating impulse transmitter, and a receiver together with a transmitter servile thereto installed on the obstacle. The latter unit, the transpondor, is operative responsively to a received signal from the interrogator to emit a signal which identifies the obstacle. The signal may be coded as desired, but in a simple system a selected time delay between the reception of the interrogator impulse and the transmission of a response impulse is sufficient to yield an adequate amount of information. The response impulse is detected by a local receiver.

In many situations it is necessary to correlate the information received from the echo ranging installation with that received on the identification system. In particular, this is true where one of a number of obstacles indicated by the echo ranging system is transmitting an identification signal. Through the employment of the present invention, it is immediately manifest to the operator which of the obstacles indicated is emitting the identification signal.

It is accordingly an object of the invention to provide for coordinate operation of the echo ranging and recognition systems.

It is another object of the invention to provide a common indicator for echo ranging and identification systems.

This invention will be further described with reference to the drawings, in which:

Figure 1 shows in block diagram an exemplary system of the present invention,

Figure 2 shows in circuit diagram the coordinating components of the present invention, and Figure 3 shows wave forms present at various operating points in the diagram of Figure 2.

In the embodiment shown in Figure 1 a radio echo system is used. This comprises an impulse transmitter 1 and radio echo receiver 2. This system may be of any conventional type, and is employed without change in the present coordinated installation.

The invention also contemplates the use of an identification system including an impulse transmitter 3, and identification response signal receiver 4.

The present invention coordinates the operation of the identification system with that of the radio echo ranging system, and simultaneously indicates the information received on both systems upon the face of a single cathode ray tube.

This is effected by operating the identification impulse transmitter on alternate operations of the echo ranging impulse transmitter. This operation is obtained under control of a signal generated in the echo ranging transmitter. In the system shown, this transmitter includes a keying circuit and this keying circuit is employed to originate a control signal for the identification system. The latter is fed into a trigger circuit, or frequency divider, which is operative to generate control signals in two separate channels. The signals in one channel correspond to one series of alternate transmitter impulses, and the signals in the other channel coincide with the intervening series of alternate transmitter impulses.

The system includes a cathode ray tube 6 and a sweep generator 7 therefor. The latter may generate a linear sweep, and is operative responsively to an injected pulse.

In the series of impulse transmissions during which echo ranging information is applied to cathode ray tube 6, a control signal from trigger circuit 5 operates directly on sweep generator 7, and simultaneously effects application of the echo signals from receiver 2 to the cathode ray tube through a signal channel control device 8.

In the other series of alternate impulse transmissions, during which the identification impulse transmitter is operated and the identification signal receiver information is applied to cathode ray tube 6, the other output channel of trigger circuit 5 keys off the identification impulse transmitter 3, applies the identification receiver output to cathode ray tube 6 through operation of the signal channel control means 9, and also trips off the cathode ray tube sweep generator 7 through the operation of a delayed signal generator 10. Delayed signal generator 10 is employed for the purpose of aligning the sweep position of the identification signal with that of the radio echo ranging system signal. As pointed out above, the transponder unit may emit an identification response signal with a coding time delay. This delay may be compensated by the delay generator 10, so that the generation of the sweep voltage be applied to cathode ray tube 6 is correspondingly delayed. Consequently, the identification indication is aligned with the echo ranging indication of the same object, and correlation between the information obtained on both systems is immediately apparent to the operator.

It will be understood that normally the echo ranging and identification systems preferably operate on different frequencies.

In the circuit shown in Figure 2 the keying signal coinciding with the radio echo impulse transmitter operation is introduced at terminals 15, This constitutes the master control signal, which controls operation of the entire circuit shown in Figure 2. The signal introduced at terminals 15 effects operation of a trigger circuit comprising two vacuum tubes, 16 and 17. These two tubes are connected for alternate conduction in a regenerative trigger circuit. A positive voltage source 18 is supplied for energizing anodes 19 and screen grids 20 of the tubes, and negative voltage source 22 is provided to supply negative bias for control grids 23. Cathode 24 of tube 16 is returned to ground through cathode resistor 25, and cathode 26 of tube 17 is returned to ground through cathode resistor 27.

The operation of the circuit including tubes 16 and 17 is such as to transfer conduction from one tube to the other upon the introduction of a positive impulse voltage to the control grid of the non-conducting tube. This impulse voltage is introduced at each operation of transmitter 1. Therefore tube 16 will be in conduction during alternate impulse transmitter operation cycles, tube 17 will be in conduction during the intervening series of cycles, and the trigger circuit may be employed to supply the desired control voltages for the components shown in Figure 1.

Cutoff in tube 17 is employed to supply a trigger voltage to the identification impulse transmitter 3. For this purpose the positive anode swing accompanying cutoff in tube 17 is differentiated through condenser 30 across resistor 31, and is applied to control grid 32 of cathode follower tube 33. The output of this cathode follower tube 33, which acts as a low impedance source, is then applied to control grid 34 of a second cathode follower tube 35. The output of tube 35 is applied at terminal 36, which may be connected to the identification impulse transmitter for keying the same on one series of alternate radio echo ranging impulse transmitter operation. By driving cathode follower 35 from follower 33, the grid of the output tube may be driven into grid conduction operation to supply substantial voltage signals across a low impedance load. It will be understood that the negative impulses introduced to grid 32 upon conduction of tube 17, have substantially no effect at terminal 36, since both this negative impulse and the resulting smaller negative impulse applied at control grid 34 do not result in any such magnitude of voltage delivered at terminals 36. Also, identification impulse transmitter 3 will be suitably constructed so as not to be responsive to negative input voltages.

The positive swing of the anode of tube 17 accompanying cutoff is employed additionally for operating the delay generator 10, which comprises tubes 40 and 41. These tubes are arranged for alternate conduction, but tube 41 is normally maintained in conduction by application of a positive voltage on its control grid 42 through resistor 43 connected to anode 44 of tube 40. Control grid 45 of tube 40 is connected to anode 47 of tube 41 through a coupling condenser 46. Condenser 46 is of a rather substantial value. Control grid 45 of tube 40 is also connected to the anode of tube 17 through series resistor 48 and adjustable voltage divider 49. The time constant of grid 45 is determined by condenser 46 in combination with series resistor 48 and the adjustable voltage divider 49. Accordingly, when the anode 19 swings positive, grid 45 also moves positive at a rate depending upon the setting of voltage divider 49. It is apparent therefore, that tube 40 will go into conduction a selectable time after tube 17 cuts off. The divided control may be calibrated directly in the delay time which is effected by the circuit. The feedback from tubes 41 to tube 40 through condenser 46 causes a rapid shift in conduction between the tubes. This supplies a positive output voltage at anode 47 of tube 41.

The delayed positive voltage swing supplied at anode 47 tube 41 is differentiated through condenser 51 and resistor 52. The positive voltage pip thereby generated is applied at control grid 53 of tube 54. This tube is connected as a cathode follower in parallel with tube 55. Their output is supplied to terminal 56 for the purpose of connection to the sweep generator 7 shown in Figure 1.

It will be understood that the negative voltage pip applied to control grid 53 of tube 54, accompanying reestablishment of conduction in tube 41, does not effect operation of the sweep generator 7.

In the circuit of Figure 2 the output of the identification signal receiver 4 is applied at terminal 60 to tube 61. Operation of tube 61 is controlled by the bias voltage developed across its cathode resistor 62, and for this purpose cathode 26 of tube 17 is coupled to resistor 62. Consequently, cathode 63 of tube 61 is maintained at a relatively high positive bias during conduction of tube 17, so that tube 61 is effectively blocked during this period. Upon cutoff of tube 17, the bias developed across cathode resistor 27 falls to zero and consequently the cutoff bias applied to tube 61 is removed. During the ensuing period in which tube 17 is non-conducting, the signal applied at terminal 60 to the grid of tube 61 is suitably amplified and applied to tube 65. The signal developed at anode 66 of tube 65 is delivered at terminal 67 for application to a deflection electrode of cathode ray tube 6.

In an embodiment of the invention wherein the sweep signal developed by generator 7 is applied to the horizontal deflecting plates of a cathode ray tube, the signal developed at terminal 67 may be applied to the vertical deflection plates, so that the output of the identification signal receiver 66 is developed on the time base as a vertical deflection. Where a positive identification signal is applied to tube 61 at terminal 60, a positive voltage will be supplied at output terminal 67.

The positive swing of anode 19 of tube 16 which accompanies cutoff of this tube constitutes the signal for keying sweep generator 7 in synchronism with the echo ranging impulse transmitter 1, and for applying the output of the radio echo signal receiver to the cathode ray tube. For this purpose the positive swing of the anode 19 of tube 16 is differentiated through condenser 70 and resistor 71 for application to control grid 72 of cathode follower tube 55. The output of this tube is applied at terminals 56 for connection with the sweep generator wherein it acts as triggering voltage.

The output of the radio echo receiver is applied at terminal 75 for introduction to control grid 76 of cathode follower tube 77. Operation of this tube is controlled by the bias voltage developed across cathode resistor 25 of tube 16, in the same manner as conduction in tube 61 is controlled by the voltage developed across cathode resistor 27 of tube 17. Inasmuch as tubes 16 and 17 are alternately conductive, so are tubes 61 and 77. The effective negative grid bias supplied to tube 77 is withdrawn upon cutoff of tube 16, and remains withdrawn until the latter returns to the conducting condition. The output of tube 77 is applied as cathode modulation to tube 78, which is provided with a grounded grid. The output of tube 78 is developed across anode resistor 79, as is the output of tube 61. Similarly its output is also applied to the control grid of tube 65 so that the radio echo receiver signal is delivered at terminal 67. Where a positive radio echo signal is applied at terminal 75 this signal is delivered uninverted through tubes 77 and 78, and is then inverted in tube 65 to supply a negative signal at terminal 67 for application to the cathode ray tube indicator.

In addition to providing for deflection in the opposite sense of the radio echo signal and the identification signal, it may be desired to separate the cathode ray tube traces upon which these signals are superimposed. This may be accomplished by effecting different conducting conditions in tubes 78 and 61, through which tubes the respective signals are applied to tube 65. In the embodiment shown in Figure 2, this result may be obtained by controlling the cathode biasing of these two tubes. To this end the combination of resistors 62 and 27 in parallel may be made of considerably higher value than the combination resistance of cathode resistors 25 and 30. In this case more bias will be present on tube 61 during its transmission than is present on tube 78 during the latter's transmission. This results in the effective application of a positive bias on the control grid of tube 65 during the conduction period of tube 61. This positive voltage will be communicated at terminal 67 for application to the vertical deflection plates of the cathod ray tube, and consequently will produce a separation in a vertical direction between the cathode ray tube traces which provide indication of the radio echo signal and the identification signal.

Through the operation of the circuit of Figure 2, the echo ranging indication pattern remains geometrically fixed on the face of the indicator tube. Aligned therewith appears the time base line for the identification indications, but this indication pattern may be adjusted along its base line and relative to the fixed echo indications. Consequently a transparent range scale may be employed overlying the echo indications without loss of its zero calibration on adjustment of the identification signal position.

The control voltage waveforms present at various points in Figure 2 are shown diagrammatically in Figure 3. At "a" is indicated the recurrent pulse supplied at terminal 15 from the radio echo impulse transmitter 1. The voltage developed at anode 19 of tube 16 is shown at "b," and the voltage developed at anode 19 of tube 17 is shown at "c." The voltage developed at cathode 24 of tube 16 is shown at "d," and that of cathode 26 of tube 17 is shown at "e." At "f" is shown the differentiated voltage signal derived from "b," this pulse signal being applied to control grid 32 of tube 33 for keying the identification impulse transmitter. At "g" is shown the voltage supplied to control grid 53 of tube 54. This voltage is obtained by differentiating the output of the delay multivibrator, and is derived from anode 47 of tube 41. At "h" is shown the voltage delivered for keying the sweep generator 7, which is delivered at terminal 56. This signal comprises the combined outputs obtained by differentiating the signals at anode 47 of tube 41 and anode 19 of tube 16. The blocking voltages applied to the signal transmission tubes 77 and 61 are as shown respectively at "d" and "e." These tubes transmit with zero applied control voltage, and are blocked on a positive injective voltage.

It will be understood that the embodiment described is exemplary of the invention, and that the limits thereof will be ascertained by reference to the appended claims.

The invention described herein may be manufactured and used by or for the Government of the United States of America for governmental purposes without the payment of any royalties thereon or therefor.

What is claimed is:

1. In combination, a radio echo ranging system having a recurrently operative impulse transmitter, an echo receiver, an identification system having an impulse transmitter and a signal receiver, means operative in dependency on the radio echo system to operate said identification impulse transmitter on alternate operations of the echo ranging impulse transmitter, and a cathode ray tube indicator responsive to both said systems alternately to indicate the responses of both said receivers.

2. In combination, a radio echo ranging system having a recurrently operative impulse transmitter and an echo receiver, an identification system having an impulse transmitter and a signal receiver, means operative in dependency on the radio echo system to operate said identification impulse transmitter on alternate cycles of the echo ranging impulse transmitter, a cathode ray tube indicator system responsive to both said receivers to indicate their outputs along juxtaposed time base loci, and means operative to adjustably position the identification receiver response along its timing base locus.

3. In combination, a radio echo ranging system having a recurrently operative impulse transmitter and an echo receiver, an identification system having an impulse transmitter and a signal receiver, means operative in dependency on the radio echo system to operate said identification impulse transmitter on alternate cycles of the echo ranging impulse transmitter, a cathode ray tube responsive to both said receivers to indicate their outputs along juxtaposed time base loci, and means operative to adjustably position the identification receiver response along its timing base while maintaining the echo receiver response stationary on its time base.

4. In combination, a radio echo ranging system having a recurrently operative impulse transmitter and an echo receiver, an identification system having an impulse transmitter and a signal receiver, means operative in dependency on the radio echo system to operate said identification impulse transmitter on alternate cycles of the echo ranging impulse transmitter, a cathode ray tube, a sweep generator therefor, means for tripping said sweep in alternate cycles in adjustable relation to the identification impulse transmitter operation, means for tripping said sweep in dependency on the radio echo impulse transmitter in the other series of alternate cycles, and means for selectively applying the receiver outputs to said tube.

5. In combination, a radio echo ranging system having a recurrently operative impulse transmitter and an echo receiver, an identification system having an impulse transmitter and a signal receiver, a pair of tubes arranged for alternate conduction, control means for said tubes operative to shift conduction from one to the other in dependency on radio echo impulse transmitter operation, a cathode ray tube, a sweep generator therefor, means responsive to conduction in one of said pair of tubes operative to trip said identification impulse transmitter, means responsive to conduction in said one tube to trip said sweep generator, means responsive to conduction in said one tube to apply the output of the identification signal receiver to the cathode ray tube, means responsive to conduction in the other of said pair of tubes to trip the sweep generator, and means responsive to conduction in said other tube to apply the output of the radio echo receiver to the cathode ray tube.

6. In combination, a radio echo ranging system having a recurrently operative impulse transmitter and an echo receiver, an identification system having an impulse transmitter and a signal receiver, a pair of tubes arranged for alternate conduction, control means for said tubes operative to shift conduction from one to the other in dependency on radio echo impulse transmitter operation, a cathode ray tube, a sweep generator therefor, means responsive to conduction in one of said pair of tubes operative to trip said identification impulse transmitter, means responsive to conduction in said one tube to trip said sweep generator after an adjustable time delay, means responsive to conduction in said one tube to apply the output of the identification signal receiver to the cathode ray tube, means responsive to conduction in the other of said pair of tubes to trip the sweep generator, and means responsive to conduction in said other tube to apply the output of the radio echo receiver to the cathode ray tube.

7. In combination, a radio echo ranging system having a recurrently operative impulse transmitter, and an echo receiver, an identification system having an impulse transmitter and a signal receiver, a pair of tubes arranged for alternate conduction, control means for said tubes operative to shift conduction from one to the other in dependency on radio echo impulse transmitter operation, a cathode ray tube, a sweep generator therefor, means responsive to conduction in one of said pair of tubes operative to trip said identification impulse transmitter, means responsive to conduction in said one tube to trip said sweep generator, means responsive to conduction in said one tube to apply the output of the identification signal receiver to the cathode ray tube along one locus, and means responsive to conduction in said other tube to apply the output of the radio echo receiver to the cathode ray tube along another locus.

8. In combination, a radio echo ranging system having a recurrently operative impulse transmitter and an echo receiver, an identification system having an impulse transmitter and a signal receiver, a pair of tubes arranged for alternate conduction, control means for said tubes operative to shift conduction from one to the other in dependency on radio echo impulse transmitter operation, a cathode ray tube, a sweep generator therefor, means responsive to conduction in one of said pair of tubes operative to trip said identification impulse transmitter, means responsive to conduction in said one tube to apply the output of the identification signal receiver to the cathode ray tube along one locus, and means responsive to conduction in said other tube to apply the output of the radio echo receiver to the cathode ray tube along another locus.

9. In combination, a radio echo ranging system having a recurrently operative impulse transmitter and an echo receiver, an identification system having an impulse transmitter and a signal receiver, an assymetric switching circuit comprising a pair of tubes arranged for unequal alternate conduction, a common load circuit fed by the tubes, means responsive to radio echo impulse transmitter operation to shift conduction between said tubes, means for applying the echo receiver output to one of said tubes, means for applying the signal receiver output to the other of said tubes, means responsive to the switching circuit operative to trip the identification impulse transmitter, a cathode ray tube, a sweep generator therefor operative in dependency on the switching circuit, and means for applying the load circuit signal to the tube whereby the echo and signal receiver outputs are selectively indicated by the tube.

10. In combination, impulse transmitter means, an echo receiver, a signal receiver, an assymetric switching circuit including a pair of tubes arranged for unequal alternate conduction, a common load circuit fed by the tubes, means responsive to impulse transmitter means operative to shift conduction between said tubes, means for applying the echo receiver output to one of said tubes, means for applying the signal receiver output to the other of said tubes, a cathode ray tube, a sweep generator therefor operative in dependency on the switching circuit, and means for applying the load circuit to the tube whereby the echo and signal receiver output are selectively indicated by the tube.

11. In combination, recurrently operative impulse transmitter means, an impulse echo receiver, a signal receiver, a cathod ray tube, sweep generator means for said tube, switching means operative in dependency on operation of the transmitter means to connect one or the other receiver outputs to the tube, and control means for the sweep generator means operative to trip the same in fixed time relation to impulse transmitter operation on connection of the echo receiver to the tube and in variable time relation to impulse transmitter operation on connection of the signal receiver to the tube.

12. In combination, recurrently operative impulse transmitter means, an impulse echo receiver, a signal receiver, a cathode ray tube, sweep generator means for said tube, switching means operative in dependency on operation of the transmitter means to connect one or the other receiver outputs to the tube, and control means for the sweep generator means operative to trip the same in fixed time relation to impulse transmitter operation on connection of the echo receiver to the tube and in variably delayed time relation to impulse transmitter operation on connection of the signal receiver to the tube.

ARTHUR A. VARELA.

REFERENCES CITED

The following references are of record in the file of this patent:

UNITED STATES PATENTS

| Number | Name | Date |
| --- | --- | --- |
| 2,157,122 | Dunmore | May 9, 1939 |
| 2,403,755 | Rankin | July 9, 1946 |
| 2,405,930 | Goldberg | Aug. 13, 1946 |
| 2,466,711 | Kenyon | Apr. 12, 1949 |
| 2,471,373 | Joyner | May 24, 1949 |
| 2,515,178 | Barchok | July 13, 1950 |

OTHER REFERENCES

Radar System Fundamentals, War Dept. Publication TM 11-467, April, 1944.